(12) United States Patent
Cheng et al.

(10) Patent No.: US 11,372,385 B2
(45) Date of Patent: Jun. 28, 2022

(54) SHOT PEENING VALVE CONTROLLER

(71) Applicant: ABRASIVE ENGINEERING PTE. LTD., Singapore (SG)

(72) Inventors: Chia Loon Cheng, Singapore (SG); Chong Wei Lee, Singapore (SG); Keng Huat Tan, Singapore (SG); Ser Hean Tan, Singapore (SG)

(73) Assignee: ABRASIVE ENGINEERING PTE. LTD., Singapore (SG)

( * ) Notice: Subject to any disclaimer, the term of this patent is extended or adjusted under 35 U.S.C. 154(b) by 305 days.

(21) Appl. No.: 16/471,326

(22) PCT Filed: Oct. 25, 2017

(86) PCT No.: PCT/SG2017/050534
§ 371 (c)(1),
(2) Date: Jun. 19, 2019

(87) PCT Pub. No.: WO2018/117960
PCT Pub. Date: Jun. 28, 2018

(65) Prior Publication Data
US 2020/0117155 A1    Apr. 16, 2020

(30) Foreign Application Priority Data
Dec. 20, 2016 (SG) .......................... 10201610688R

(51) Int. Cl.
*B24C 1/10* (2006.01)
*G05B 19/042* (2006.01)
(52) U.S. Cl.
CPC ............. *G05B 19/042* (2013.01); *B24C 1/10* (2013.01); *G05B 2219/25312* (2013.01)

(58) Field of Classification Search
CPC ........ G05B 19/042; G05B 2219/25312; G05B 19/43; B24C 1/10
See application file for complete search history.

(56) References Cited

U.S. PATENT DOCUMENTS

| 3,423,976 A * | 1/1969 | Burney | ..................... B24C 1/10 72/53 |
| 5,249,140 A * | 9/1993 | Kessler | ................... G05B 19/46 700/2 |
| 5,714,938 A * | 2/1998 | Schwabl | ................ G08B 17/06 340/584 |

(Continued)

FOREIGN PATENT DOCUMENTS

GB    2271491 A    4/1994

OTHER PUBLICATIONS

Kumar Balan, "Control Systems in Shot Peening—A Discussion", May 1, 2014 (May 1, 2014), The Shot Peener, Spring Edition, vol. 28, No. 2, pp. 22, 26, 28 (Year: 2014).*

(Continued)

*Primary Examiner* — Ryan J. Walters
(74) *Attorney, Agent, or Firm* — Rimon, P.C.

(57) ABSTRACT

A shot peening valve controller comprises a hub connector configurable for connecting or operating one or more shot peening valve; a microprocessor that is connected to the hub connector; and a human-machine interface that is connected to the microprocessor. The human-machine interface is configured to operate the one or more shot peening valves respectively.

27 Claims, 11 Drawing Sheets

(56) References Cited

U.S. PATENT DOCUMENTS

| | | | |
|---|---|---|---|
| 6,446,202 B1 | 9/2002 | Krivoshein et al. | |
| 6,694,789 B2 * | 2/2004 | Yamamoto | B24C 1/10 |
| | | | 72/53 |
| 2002/0108440 A1 * | 8/2002 | Colman | G01F 23/243 |
| | | | 73/304 R |
| 2013/0125600 A1 | 5/2013 | Kobayashi et al. | |

OTHER PUBLICATIONS

International Search Report for PCT/SG2017/050534 dated Jun. 12, 2018.
Written Opinion of the International Searching Authority for PCT/SG2017/050534 dated Jun. 12, 2018.

* cited by examiner

SHOT PEENING VALVE CONTROLLER

CROSS-REFERENCE TO RELATED APPLICATIONS

This application is a national stage application (under 35 U.S.C. § 371) of PCT/SG2017/050534, filed Oct. 25, 2017, which claims benefit of Singapore Application No. 10201610688R, filed Dec. 20, 2016, both of which are incorporated herein by reference in their entirety.

The present application claims a filing date of an earlier Singapore patent application number 10201610688R as a priority date, which was submitted to Intellectual Property Office of Singapore (IPOS) on 20 Dec. 2016. All contents or relevant subject matter of the priority application is hereby incorporated entirely or wherever appropriate by reference.

The present application relates to a shot peening valve controller for controlling multiple shot peening valves. The shot peening valve controller is also known as a hub shot peening valve controller or simply a hub controller because the shot peening valve controller is configured to operate multiple shot peening valves. The application further relates a shot peening valve assembly for shot peening. The application additionally relates to a shot peening machine for inducing residual compressive stress on surfaces of mechanical components. The application also relates methods for making, assembling, disassembling, installing, configuring, maintaining, diagnosing, repairing, upgrading and using the shot peening valve controller. The shot peening valve controller is alternatively known as a central shot peening valve controller, a central hub, a hub controller or simply a controller.

Shot peening is a cold working process that is used to produce a compressive residual stress layer and modify mechanical properties of metals and composites. The shot peening or shot peening process entails impacting a surface with shot (e.g. round metallic, glass, or ceramic particles) having force sufficient to create plastic deformation. Shot peening process is similar to sandblasting, except that shot peening process operates by the mechanism of plasticity rather than abrasion. Particles of shot peening process operate as a ball-peen hammer, which typically do not remove material from objects of shot peening, creating less dust. To achieve optimum results, shot peening process needs to be regulated or controlled precisely.

The present invention aims to provide one or more new and useful shot peening valve controllers, shot peening valve assemblies or shot peening machines for regulating shot peening manufacturing process. The invention also wishes to offer one or more new and useful methods for making, assembling, disassembling, installing, configuring, maintaining, diagnosing repairing, upgrading and using the one or more shot peening valve controllers, shot peening valve assemblies, or shot peening machines. Essential features of the invention are provided by one or more independent claims, whilst preferred features are presented by their dependent claims respectively.

According to a first aspect, the present application provides a shot peening valve controller for operating multiple controlling shot peening valves individually or simultaneously. The one or more shot peening valves regulate flow of non-ferrous or ferrous shot peening media in either direct pressure or suction type air blast machines, such as a normally closed valve. The shot peening valve controller comprises a central processing unit (e.g. microprocessor) configured to carry out instructions of a computer programme; a memory or computer-readable memory (e.g. ROM, RAM, programmable ROM, FPROM, EAPROM, EEPROM) connected to the central processing unit for storing information of the computer programme; an input output unit further connected to the central processing unit for connecting to an external electronic device; and an internal bus additionally connected to the central processing unit, the memory, the input output unit or a combination of any of these components. The input output unit comprises a user interface or an interactive user interface for displaying performance data of the shot peening valve controller.

The central processing unit (CPU) is the electronic circuitry a processor within a computer or PLC (programmable logic controller) that carries out instructions of the computer program by performing basic arithmetic, logical, control and input/output (I/O) operations specified by computer program. The input output unit comprises one or more communication terminals, antennas, modules and human machine interfaces (also known as user interface or interactive user interface), such as UART (universal asynchronous receiver-transmitter), RS-485 module (also known as TIA-485(-A), EIA-485), HMI (human machine interface), analogue input module, analogue output module, digital input module and digital output module. Particularly, the user interface or an interactive user interface include multiple buttons, windows, fields or illuminators (e.g. light-emitting diodes) for presenting information of the shot peening valve controller. Moreover, the user interface or interactive user interface is capable of displaying coloured or monochrome (e.g. green or red) graphics such that one or more charts or graphs are able to represented by user interface. In contrast to text, graphs or text with multiple colours give good contrast and overview of data representation, making users easy to understand and operate. For example, the user interface provides a target curve of shots flow rate in green colour and an actual curve of shots flow rate as measured on a two-dimensional Cartesian coordinate plane.

Although the user interface or interactive user interface optionally can provide text message (e.g. alphanumeric data), the user interface optionally comprises a flat panel display for showing graphs or non-English languages (e.g. Chinese text). Examples of the flat panel display includes a liquid crystal display, a liquid crystal display with light-emitting diode (LED) backlighting, a plasma panel, an electroluminescent panel, an organic light-emitting diode, a volatile display and a static flat-panel display. If course, the user interface (UI) optionally includes a man-machine interface (MMI) and a computer human-computer interface. Particularly, the user interface includes a Graphical User Interface (GUI), a voice user interface and an adaptive user interface.

The shot peening valve controller can provide a standalone device that is external to one or more shot peening valves for connecting with the shot peening valve controller. The standalone shot peening valve controller is able to be manufactured, programmed, configured or repaired separately from other devices (e.g. shot peening valves) so that either the shot peening valve controller or its connected external shot peening valves are able to be replaced, exchanged or upgraded without affecting each other. If a faulty or outdated shot peening valve controller is easily purchased and installed by a user himself at a shot peening factory, without requiring a vendor of the shot peening valve controller or shot peening valves to be present. Both the user and the vendor enjoys flexibility or low cost when exchanging or upgrading the shot peening valve controller or shot peening valves.

According to embodiments of the relevant invention or application, the flat panel display comprises a touchscreen display, a tactile display or an electronic visual display for interacting with users, instead of nixie tubes, LED display and VF display. The touchscreen provides an intuitive user interface that is capable of showing buttons, graphs and alphanumeric text of shot peening process. For example, the touchscreen gives a 2D (two dimensional) or 3D (three dimensional) graph on shot peening parameters (e.g. impact velocity, types and sizes of shot). The touchscreen thus is more flexible, adaptable and capable of presenting information or receiving input.

The input output unit comprises one or more computer ports that further include a programming port (computer port) for connecting to a programming console, a computer or a hand-held terminal. For example, the computer ports include a USB (universal serial bus) port, an Ethernet port and RS232 port. The one or more computer ports facilitate local or remote connection (e.g. internet connection) so that an operator of a shot peening machine locally, or a technician of the shot peening control valve remotely is able to configure parameters of the shot peening control valve when necessary. Multiple ports of the shot peening control valve or the input output unit provide hardware redundancy such that a good computer port (e.g. USB port) is able to facilitate electronic communication when a faulty computer (e.g. wireless port) cannot.

The input output unit includes a communication interface, a digital input interface (DC voltage input, AC voltage output), a digital output interface (e.g. relay output, transistor output, triac output), an analogue input output interface, a pulse counter and timer. The interface is alternatively known as a module. For example, the digital input interface is also known as a digital input module. The communication interface comprises a wireless communication terminal for remote access. The wireless communication terminal includes one or more antennas, such as a Bluetooth antenna, a Wi-Fi antenna, a 2G antenna, a 3G antenna, a LTE antenna, a 4G antenna, a 5G antenna, etc.

More importantly, the input output unit optionally comprises multiple electronic addresses for connecting to multiple shot peening valves respectively in order to transmit digital signals, analogue signals, DC power or current, or AC power or current. The multiple electronic addresses may be in the form of hardware, software or both hardware and software. For example, an electronic address in the hardware form includes contact terminals, such as splices, cups, hooks, solder lugs, tongue crimp terminals (ring terminals), turrets, test probes (pogo terminals), clips, screw terminals, tab terminals (quick-connect, quick-disconnect) and wire nuts. An electronic address in the software form includes digital addresses that are possibly recorded or programmed in the memory. For example, when connected to four shot peening valves with 2-bits electronic addresses (i.e. $2^2$), the shot peening valve controller has a first electronic address of "00" for a first shot peening valve, a second electronic address of "01" for a second shot peening valve, a third electronic address of "10" for a third shot peening valve and a fourth electronic address of "11" for a fourth shot peening valve, which are all connected to the shot peening valve controller. The shot peening valve controller is able to selectively communicate signals (e.g. receive sensor analogue signals, send digital control signals) or power (e.g. 0~10 Vdc, 0~24 Vdc at 10 mA) with each of these multiple shot peening valves according to their electronic addresses respectively. Hence, instead of powering multiple shot peening valves simultaneously, the shot peening valve controller is able to configure, diagnose, control, patch, install or power the multiple shot peening valves individually according to their electronic addresses respectively. In practice, three of the shot peening valves may be in operation, whilst the remaining shot peening valve is being configured or patched with the latest software or firmware on a new program of shot peening, known as a recipe. Whether in software or hardware form, the one or more multiple electronic addresses are expandable, mutable, reconfigurable or upgradeable. For example, the multiple electronic addresses may be increased to 3-bits binary addresses (i.e. $2^3$), such as 000, 001, 010, 011, 100, 101, 110, 111 for connecting eight shot peening valves to the shot peening valve controller.

The multiple shot peening valves have their respective channels that are connected to the shot peening valve controller (also known as shot peening controller or simply controller). For example, the shot peening valve controller has a first channel for connecting to a first shot peening valve; a second channel for connecting to a second shot peening valve; a third channel for connecting to a third shot peening valve; a fourth channel for connecting to a fourth shot peening valve; and so on. Each of these channels include its respective analogue terminals, digital terminals, power terminals and other electrical terminals associated with the respective shot peening valves. For example, the first channel includes first analogue terminals (e.g. AI1, AO2) for connecting to a sensor on the first shot peening valve, first digital terminals (e.g. DO1, DO2, DOC) for connecting to the first shot peening valve, and first power terminals (e.g. 0V, 24V) for connecting to the first shot peening valve. The first channel is configured to receive an analogue signal, transmit a digital signal, send electric power (e.g. current, voltage) or transmit a combination of electric current or voltage. Accordingly, the multiple electronic addresses comprise multiple input electronic addresses and multiple output electronic addresses that are associated with their respective channels according to the multiple shot peening valves. The multiple channels or predetermined channels, such as the first channel and the second channel, are optionally independent from each other for their connection, operation, configuration or a combination of any of these whether by software or hardware.

The multiple channels, such as the first channel and the second channel, sometimes share some wires, electrical connections or terminals for transmitting input signals, input power, output signal or output power to the multiple shot peening valves. For example, the shot peening valve controller provides terminal points of earth ground, 0V and 24V that can be commonly used by the multiple shot peening valves. The shot peening valve accordingly requires less number of wires, electrical connections or terminals for operation.

Embodiments of the shot peening valve controller have the multiple electronic addresses that comprise one or more terminal blocks or electrical connectors (e.g. plug, socket) for transmitting signals (e.g. digital signal, analogue signals) or power (DC power, AC power) via cables or wires. The one or more terminal blocks can easily be re-used in the field, allowing for replacement of wires, generally with standard hand tools and avoiding specialized mating connectors to be applied to the ends of wires.

The shot peening valve may be configured to process or handle signals or power from multiple shot peening valves simultaneously, although optionally sharing the one or more electrical connections or terminals among the multiple shot peening valves. For example, the shot peening valve controller may scan multiple channels of connected shot peening valves regularly or periodically so that the shot peening valve controller is able to monitor or control the multiple shot peening valves continuously. The shot peening valve controller thus is able to control, configure or operate the multiple shot peening valves selectively (e.g. individually), collectively (e.g. two valves together) or otherwise. For instance, the shot peening valve is configured to power the multiple shot peening valves almost concurrently, whether or not sharing one or more electrical connections or terminals among the multiple shot peening valves. Alternatively speaking, the input output unit optionally comprises electrical terminals that are shared by the multiple shot peening valves, whether or not sharing the one or more electrical connections among the multiple shot peening valves.

The shot peening valve controller can further comprise a unique identifier or unique electronic identifier for a predetermined shot peening valve. The unique identifier comprises a barcode, a serial number, a machine readable code, a QR (Quick Response) code, an IP (Internet Protocol) address (e.g. IPv4 address, IPv6 address), a MAC (Media Access Control) address, an IMEI (International Mobile Equipment Identity) number, a Wi-Fi address, a digital identity, an electronic address by hardware (e.g. screw position of a terminal block) or software (e.g. digital address "01", "11"). Hence, the shot peening valve controller optionally include multiple unique identifiers or unique electronic identifiers that are associated with multiple channels or multiple shot peening valves respectively. The multiple unique identifiers or unique electronic identifiers can provide local identification or global identifications in order to control, operate, configure, maintain or repair the shot peening valve controller. For example, the local identifier (e.g. 2-bits identifier) is able to differentiate shot peening valves connected to the shot peening valve controller in a factory. The global identifier (e.g. IPv6 address) is possible to facilitate internet connection (IoT) of a manufacturer for connecting its past produced shot peening valves worldwide.

Similar to the shot peening valve controller, the input output unit may comprise one or more connectors. Optionally, the one or more connector is protected (e.g. water resistant or waterproof, dustproof), detachable, expandable, fool-proof, lockable, shockproof or a combination of any of these. For example, a connector of the input output unit includes a 7 pin twist lock receptacle that is able to be fastened to a plug after connecting. Moreover, the one or more connectors or the multiple electronic addresses are hot-swappable. For example, the connector includes a NEMA 6-50 plug with dustproof flexible shroud, which is lockable and protected. Since the shot peening valve controller and its connected shot peening valves are often subjected to harsh factory environment, a protected or lockable connector provides durable, reliable and safe usage of the shot peening valve controller with little maintenance requirement.

The shot peening valve controller sometimes further comprises a local power supply (e.g. battery, solar panel or ambient energy harvester) that is connected to the central processing unit. The local power supply offers an uninterruptible power supply that prevents or reduces potential interruption.

The shot peening valve controller can further comprise a reset switch, a reset button or a watchdog timer for manually, automatically or remotely clearing pending errors or events and/or bringing the shot peening valve controller to normal condition or an initial state. The watchdog timer includes a single-stage watchdog, a multistage watchdog or both. The watchdog timer may initiate one of several types of corrective action, including maskable interrupt, non-maskable interrupt, processor reset, fail-safe state activation, power cycling, or combinations of these.

Some embodiments of the relevant invention(s) or application further comprises a protector for shielding components of the shot peening valve controller. For example, the protector includes a casing for protecting interior components of the shot peening valve controller. Optionally, the casing has a detachable cover for exposing the interior components. For example, the detachable cover includes a plat or cap over computer ports or programming ports of the shot peening valve controller so that the computer ports or programming ports are not accessible to unauthorised or uninformed users. The casing sometimes further comprises one or more mounting points or catches for attaching the shot peening valve controller onto a shot peening equipment. The protector also includes a protective dissipater (e.g. CPU cooling fan, computer fan or chipset fan for active cooling) for dispersing heat of the shot peening valve controller. The protector keeps potential hazards (e.g. heat) from disrupting operation of the shot peening valve controller so that the shot peening valve controller is able to operate in its desired or optimum state. For example, the protective dissipater or protected dissipater comprises an opening inaccessible to falling dust or spillage. The opening may be sheltered or positioned at a bottom side of the casing so that falling dust in a shot peening factory cannot reach internal components of the shot peening valve controller from top, and yet hot air may escape from the shot peening valve from the bottom side.

The present application additionally provides a shot peening valve assembly that comprises the shot peening valve controller for controlling shot peening valves, and a first shot peening valve connected to the shot peening valve controller via wires or wirelessly. The shot peening valve assembly optionally further comprises a second shot peening valve that is connected to the shot peening valve controller via wires or wirelessly. Additional shot peening valves (e.g. third or fourth shot peening valve) are possible to be connected to the shot peening valve controller. The shot peening valve assembly may be installed collectively or separately for a shot peening equipment or machine.

The shot peening valve assembly can further comprise an electrical cable that is connected to the first shot peening, valve, the second shot peening valve and the shot peening valve controller. For example, the electrical cable is connected to the serial port of the shot peening valve controller. Alternatively, the electrical cable is connected to a parallel port of the shot peening valve controller. On the other hand, the electric cable can be connected to the one or more computer ports or input output unit of the shot peening valve controller, whether with wires or wirelessly.

The present application further provides a shot peening equipment or shot peening machine that comprises the shot peening valve assembly, a first blast hose that is installed with the first shot peening valve; and a second blast hose that is installed with the second shot peening valve. Both the first shot peening valve, the second shot peening valve or both are connected but optionally external to the shot peening valve controller. The first shot peening valve and the second shot peening valve can be connected to the shot peening valve controller in serial, in parallel or otherwise (e.g. wirelessly).

The shot peening equipment can further comprise one or more shut-off valves installed on a blast hose that is connected to the shot peening valve, the first shot peening valve, the second shot peening valve or a combination of any of these. The shut-off valves can be manually or automatically operated, whether regulated by the shot peening valve controller or not. The one or more shut-off valves cooperate with the shot peening valve controller and/or the one or more shot peening valves so that corresponding shot peening processes can be controlled with accuracy, repeatability, fast responsiveness and durability, whether dynamically or statically.

The shot peening equipment may further comprise one or more external power supplies or power supply units (e.g. power generator or batteries) for powering the shot peening valve controller, the shot peening valve assembly, the shot peening equipment or a combination of any of these. The external power supplies or power supply units power the shot peening equipment even when facing power failure at a factory of the shot peening equipment. Parts of relevant shot peening equipment will not be damaged when facing sudden power failures.

According to a second aspect, the present application provides a method for installing a shot peening valve controller for shot peening valves. The method comprises a first step of identifying multiple shot peening valves that are to be connected to a shot peening valve controller. The method further comprises a second step of assigning an electronic identification to one or more of the multiple shot peening valves. The method additionally comprises a third step of remembering the electronic identification of the at least one shot peening valve. Some of these steps can be changed in sequence, combined or divided. The method enables an operator or factory that several shot peening valves (e.g. four shot peening valves) to be connected and operated by a single piece of shot peening valve controller. The single piece of shot peening controller provides flexibility of power or control the multiple pieces of shot peening valves individually or simultaneously. For example, the multiple shot peening valves utilise ceramic beads, glass beads and aluminium oxide beads (AlOx) respectively, and are regulated by the single pieces of shot peening valve controller with low cost, better performance and higher accuracies, whether for re-calibrated or customer-specified shot peening media.

The method may further comprise a step of transferring data to the one or more shot peening valves according to their electronic identifications respectively. The electronic identifications, also known as electronic identities or electronic addresses, may be assigned or provided in software or hardware form. For example, a terminal block of the shot peening valve controller (i.e. shot peening controller) assigns AI1, AO1 as the electronic addresses for receiving analogue input of a first shot peening valve. Additionally, another terminal block of the shot peening valve controller assigns DO1, DO2, DI1 and DI2 as the electronic addresses for transmitting digital signals of the first shot peening valve. Signals or powers of different shot peening valves do not interfere with each other throughout usage of the multiple shot peening valves.

The method can further comprise a step of compiling data of the one or more shot peening valves using one electrical cable to the one shot peening valve or more electrical cable to the other shot peening valves. The electrical cable can comprise more than one electrical wire within an external insulated cladding. The data compilation comprises activating or deactivating the shot peening valve, reading the status of the shot peening valve, controlling the type of shot peening media to use in each valve, and controlling the rate of travel of the shot peening media in each valve. In other words, acquiring the status of the shot peening valve, setting the requirements and prescribing the appropriate actions for individual shot peening valve.

According to a third aspect, the present application provides a method for configuring a shot peening valve controller. The method comprises a first step of checking if there exists a start signal from a first shot peening valve; a second step of selecting an analogue mode or a programme mode if receiving the start signal; a third step of receiving an analogue input under an analogue mode; a fourth step of converting the analogue input to feed data; a fifth step of choosing a programme or shot peening programme under a programme mode; a sixth step of loading feed data from a memory; and a seventh step of transferring the feed data to a shot peening valve. Some of these steps may be changed in sequence, combined or divided. Additionally, the method additionally includes a step of connecting a second shot peening valve to the shot peening valve controller. One or more of these steps are repeated after connecting the second shot peening valve. Of course, more shot peening valves may be linked to the shot peening valve controller for configuration and operation, which brings great savings to users. Parameters, configurations or settings of the multiple shot peening valves may be mirrored (e.g. copies), transferred or changed between the multiple shot peening valves. The shot peening valve controller benefit the users or technicians with great ease, cost saving and quality of control.

The method can further comprise a step of receiving analogue or digital feedback (e.g. signals) from the shot peening valve. The shot peening valve controller thus provides an optimum manner of regulating one or more shot peening valves almost without delay or overshoot, and possibly ensuring shot peening stability.

The method may additionally comprise a step of adjusting gain of the shot peening valve. The gain measures a ratio of a signal amplitude or power at an output port to an amplitude or power at an input port. The shot peening controller is able to automatically or manually adjust the gain to one or more of its channels, ports or electric connections so that relevant shot peening processes at respective shot peening valves are adjusted to their preferred or best performance.

The accompanying figures (Figs.) illustrate embodiments and serve to explain principles of the disclosed embodiments. It is to be understood, however, that these figures are presented for purposes of illustration only, and not for defining limits of relevant inventions.

Figure 1:
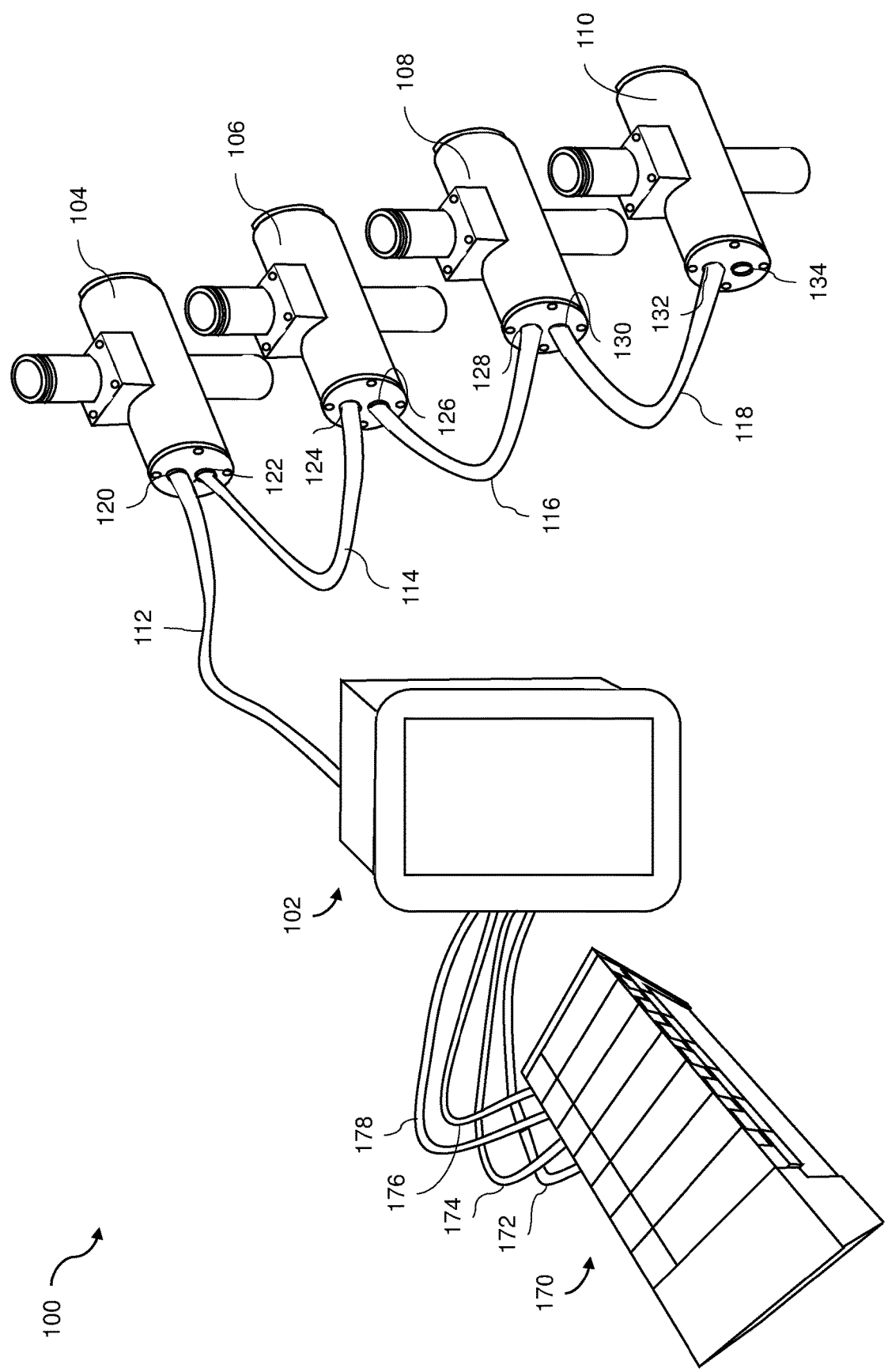
FIG. 1 illustrates a shot peening valve assembly.

Exemplary, non-limiting embodiments of the present application will now be described with references to the above-mentioned figures. Particularly, FIG. 1 illustrates a shot peening valve assembly 100 which comprises a shot peening valve controller 102 connected to a plurality of shot peening valves 104,106,108,110 in parallel. Separately, the shot peening valve controller 102 is connected to an external programmable logic controller (PLC) 170.

The shot peening valve controller 102 is linked to a first shot peening valve 104 via a first electric cable 112. A second shot peening valve 106 is further linked to the first shot peening valve 104 via a second electric cable 114. A third shot peening valve 108 is additionally linked to the second shot peening valve 106 via a third electric cable 116. A fourth shot peening valve 110 is furthermore linked to the third shot peening valve 108 via a fourth electric cable 118.

The first electric cable 112 links the shot peening valve controller 102 to a first valve input port 120 of the first shot peening valve 104. A first valve output port 122 is linked to a second valve input port 124 of the second shot peening valve 106. A second valve output port 126 is linked to a third valve input port 128 of the third shot peening valve 108. A third valve output port 130 is linked to a fourth valve input port 132 of the fourth shot peening valve 110. A fourth valve output port 134 is an open port, not linked. The two terminal ends of the electric cables 112,114,116,118 are terminated by a round female DIN connector at one end and a round male DIN connector at the second end (not shown). The valve input ports 120,124,128,132 are round female DIN connectors. The valve output ports 122,126,130,134 are round male DIN connectors.

The shot peening valve controller 102 is coupled to the programmable logic controller 170 by four cables namely a digital input cable 172, a digital output cable 174, an analogue input cable 176 and an analogue output cable 178.

Figure 2:
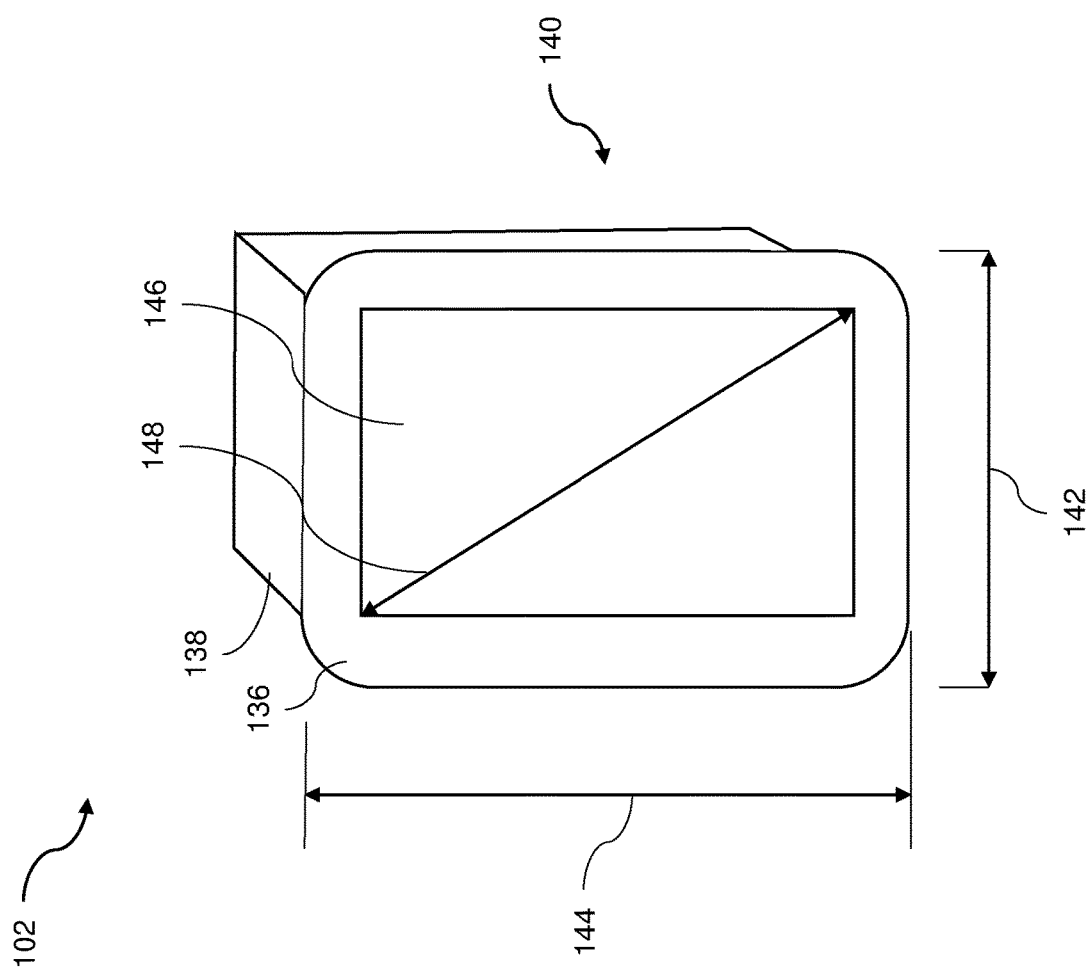
FIG. 2 illustrates a front view of the shot peening valve controller.

FIG. 2 illustrates a perspective view of the shot peening valve controller 102 primarily from the front. A front side of the shot peening valve controller 102 is a rectangular panel 136 with four rounded corners and a small rectangular aperture in a centre of the rectangular panel 136. At a back side of the shot peening valve controller 102 is a chassis 138, which is at an opposite side or back side of the rectangular panel 136.

The rectangular panel 136 has a thickness of about one millimetres (1 mm). A first long side 140 of the shot peening valve controller 102 has a shot peening valve controller length 144 of one hundred and seventy-four point five millimetres (174.5 mm). The shot peening valve controller 102 has a shot peening valve controller width 142 of one hundred thirty-two point five millimetres (132.5 mm). The shot peening valve controller length 144 and the shot peening valve controller width 142 is in fact the length and width of the rectangular panel 136 at the front side. The rectangular panel 136 is made of Acrylonitrile butadiene styrene (ABS), as a form of plastic.

A tactile display screen 146 is seen at the front side of the shot peening valve controller 102. The tactile display screen 146 is mounted into the smaller rectangular aperture framed by the rectangular panel 136. The tactile display screen 146 has a diagonal length 148 of one hundred and seventy-five millimetres (175 mm).

Figure 3:
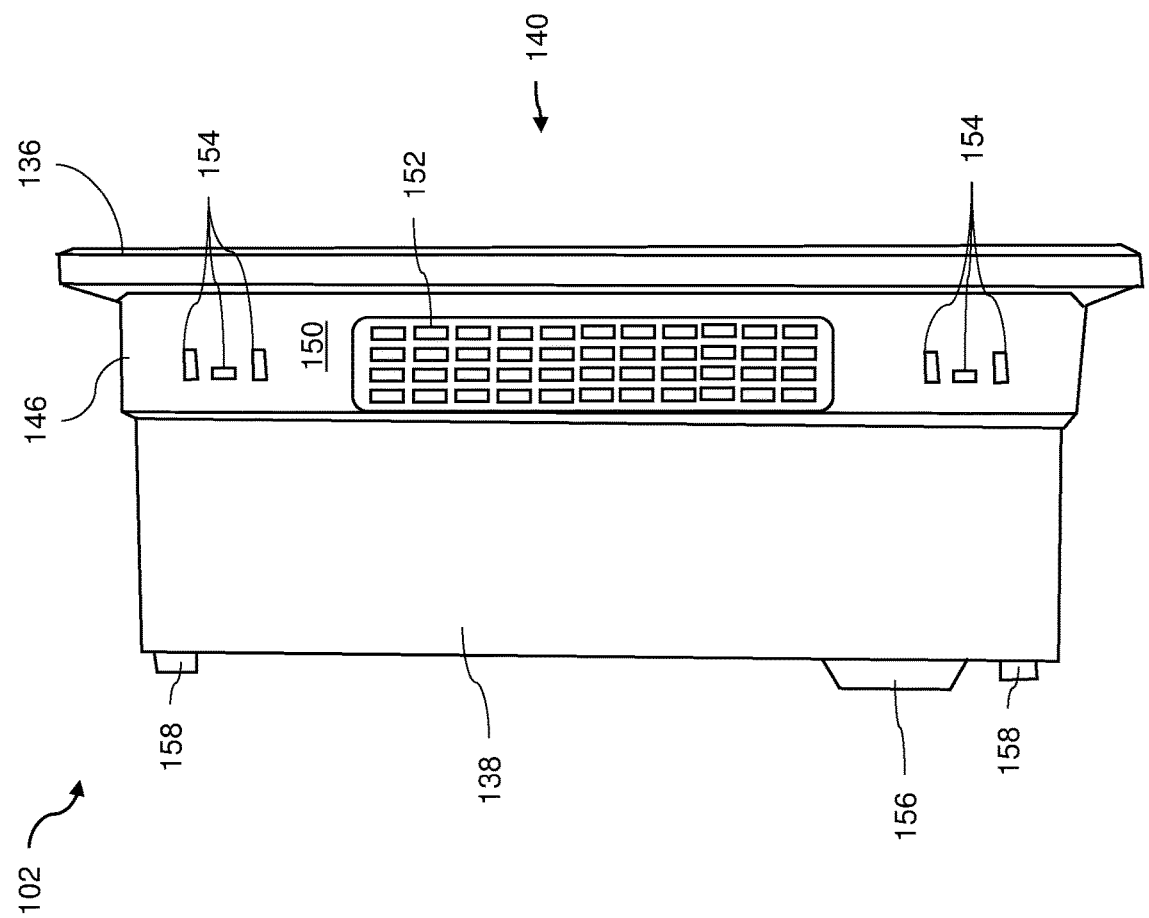
FIG. 3 illustrates a side view of the shot peening valve controller with a plastic air vent cover attached.
Figure 4:
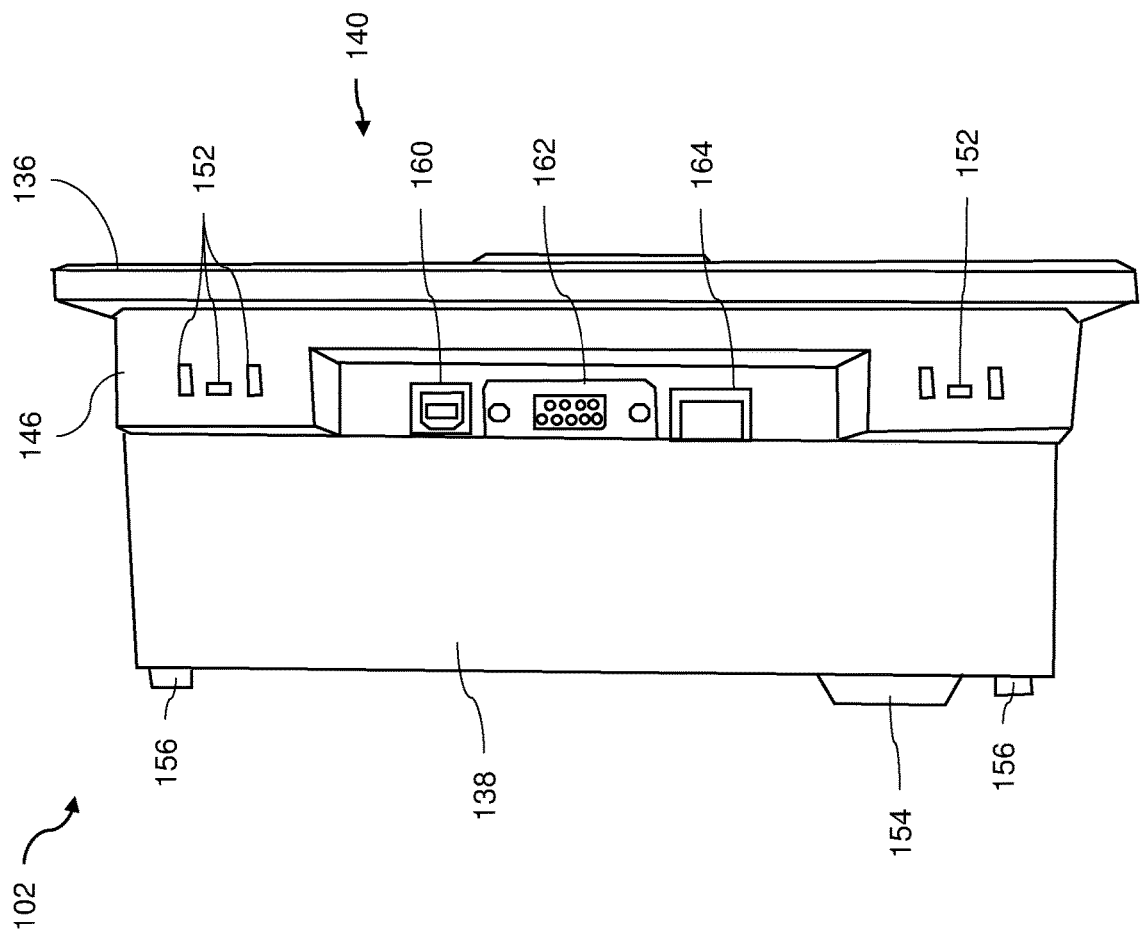
FIG. 4 illustrates another side view of the shot peening valve controller without the plastic air vent cover.

FIGS. 3 and 4 illustrates two side views of the shot peening valve controller 102 as seen from the long side 140 respectively, whilst the two side views are taken from opposite sides of the shot peening valve controller 102.

FIG. 3 illustrates the side view of the shot peening valve controller 102 as seen from the first long side 140 with a plastic air vent cover 152 attached. The tactile display screen 146 is circumscribed by a display protective casing 150. The display protective casing 150 contains electronic components and circuitry. The plastic air vent cover 152 is positioned along the side of the display protective casing 150 specifically at a centre section. There are a set of three fixing apertures 154 located at an upper and a lower section of the centre section.

The tactile display screen 146 with the rectangular panel 136 protected by the display protective casing 150 are housed in the chassis 138. At a rear side of the chassis 138 is a round DIN (Deutsches Institut für Normung) connector which is located near the bottom thereof. The round male DIN connector 156 has seven pins. The round male DIN connector 156 is covered by a rubber dust cover when not in use (e.g. connected). The display protective casing 150 and the chassis are made of Acrylonitrile butadiene styrene (ABS), which is a form of plastic. The respective thicknesses of the chassis 138 and the tactile display screen 146 are not proportionally drawn. For example, a thickness of the chassis 138 can be thicker than that of the tactile display screen 146, or vice versa.

FIG. 4 illustrates the side view of the shot peening valve controller 102 as seen from the first long side 140 with the plastic air vent cover 152 removed. A recess is revealed which is formed along the display protective casing 150. A Universal Serial Bus (USB) type B connector 160, a DE-9 (D-subminiature, E shell size) male connector 162 and a RJ45 (Registered Jack) connector are found in the recess.

Figure 5:
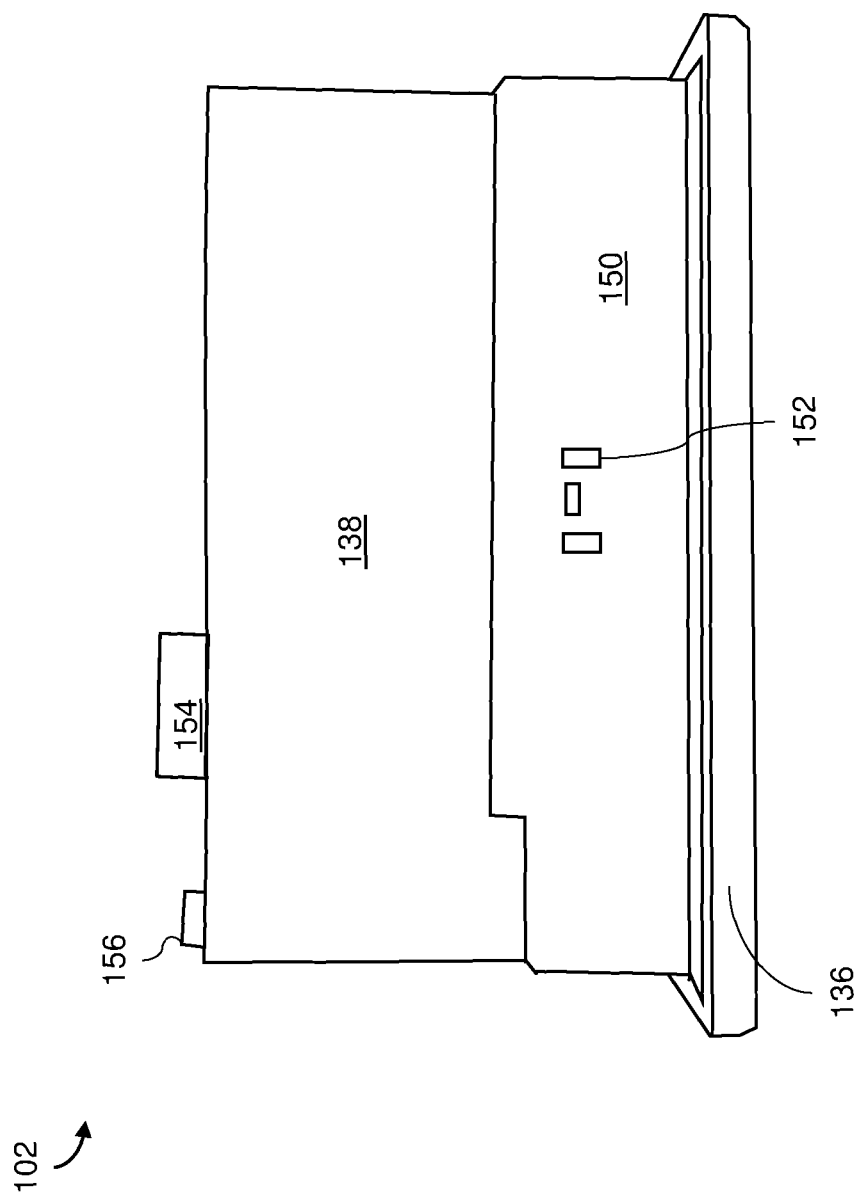
FIG. 5 illustrates a plan view of the shot peening valve controller.

FIG. 5 illustrates a plan view of the shot peening valve controller 102. The plan view shows a width of the rectangular panel 136. At a top side of the width is a set of three fixing apertures 152 which is positioned at the centre of the width of the shot peening valve controller 102. The display protective casing 150 is interposed between the rectangular panel 136 and the chassis 138. The tactile display screen 146 is supported by the display protective casing 150 forming a unit.

Figure 6:
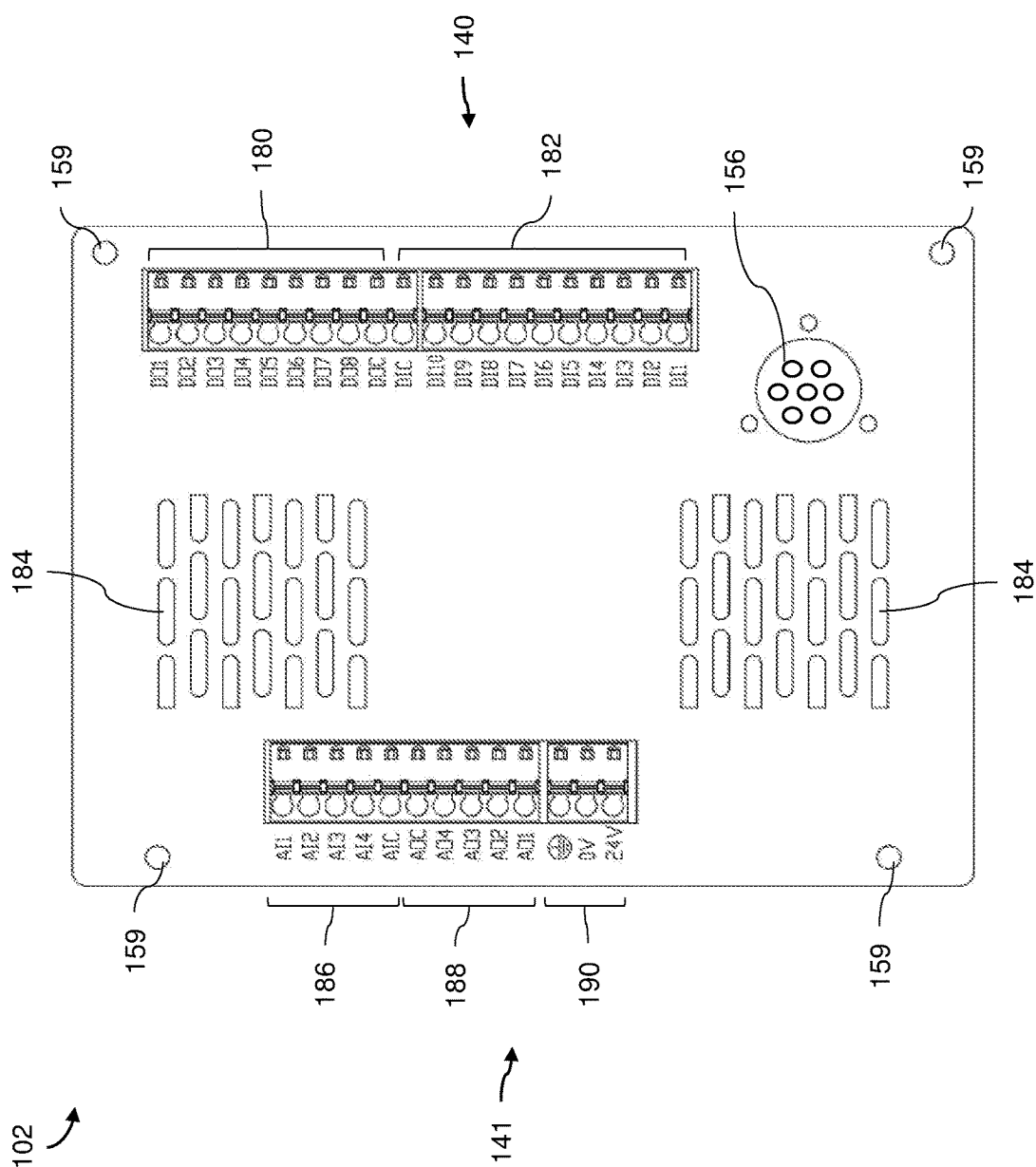
FIG. 6 illustrates a back view of the shot peening valve controller.

FIG. 6 illustrates a back view of the shot peening valve controller 102. Moving from a left to a right of the back of the shot peening valve controller 102. Along the first long side 140, there are two adjoining ten-pinned connectors (also known as terminal blocks) which are positioned parallel to the first long side 140. A first ten-pinned connector along the first long side 140 is a ten-pinned digital output connector 180 (DO1, DO2, DO3, DO4, DO5, DO6, DO7, DO8 and DOC). Eight pins are used for the digital output.

A second ten-pinned connector that is adjoined below the first ten-pinned connector is a ten-pinned digital input connector 182 (DI1, DI2, DI3, DI4, DI5, DI6, DI7, DI8, DI9, DI10 and DIC). Eleven pins are used for the digital input.

Below the ten-pinned digital input connector 182 is the round male DIN connector 156 with seven pins. A first pin is +24 Volts, a second pin is 0 Volts, a third pin is ground (earth), a fourth, a fifth and a sixth pins are for communication signalling and the seventh pin is unused. At the rear centre of the shot peening valve controller 102, there is a top rear air vent 184 and a bottom rear air vent 184. The rear air vent 184 is made up of a plurality of elongated holes. Alternatively, the rear air vent 184 can be positioned in a different location and orientation. For example, the elongated holes of the rear air vent 184 are made of a series of rectangular holes, which are positioned alongside or parallel with the connectors 180,182,186,188,190.

Along a second long side 141 is a third ten-pinned connector and a three-pinned connector. The third ten-pinned connector is divided into a five-pinned analogue input connector 186 (AI1, AI2, AI3, AI4 and AIC) and a five-pinned analogue output connector 188 (AO1, AO2, AO3, AO4 and AOC), which are also known as terminal blocks. A three-pinned power connector 190 is adjoined below the third ten-pinned connector. There are four holes 159 at the two corners of the second long side 141 and the two corners of the first long side 140.

Figure 7:
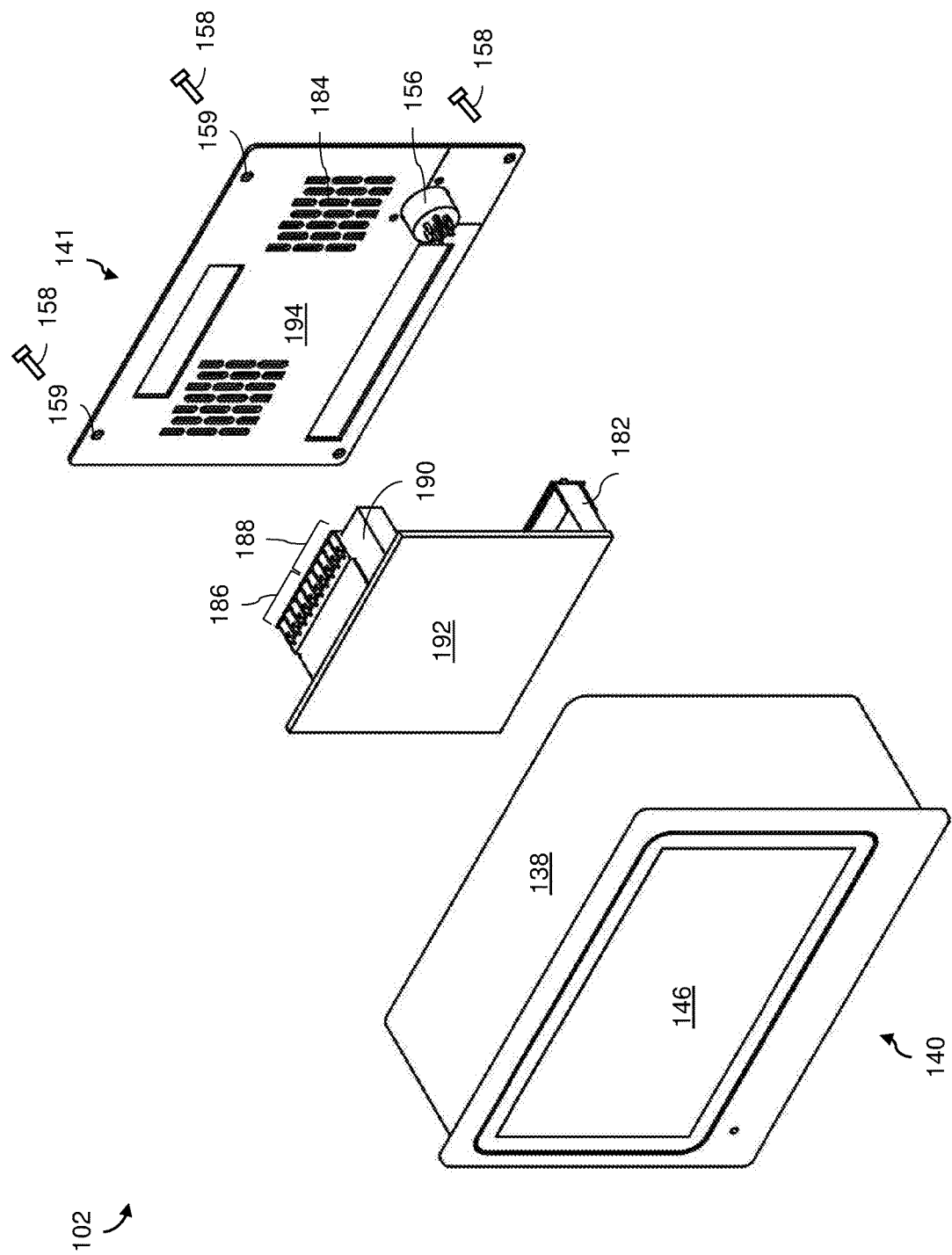
FIG. 7 illustrates an exploded view of the shot peening valve controller.

FIG. 7 illustrates an exploded view of the shot peening valve controller 102. The tactile display screen 146 with the display protective casing 150 (not shown in this figure) is housed in the chassis 138. A printed circuit board (PCB) 192 is seen mounted with the third ten-pinned connector 186, 188, the three-pinned power connector 190 and the ten-pinned digital input connector 182 on a one side thereof. The one side is the component side where surface mount components are mounted. The second side of the printed circuit board 192 is the solder side. The printed circuit 192 is housed in the chassis 138.

A shot peening valve controller back cover 194 is perforated with four holes 159 at the four corners thereof. There are also two rectangular apertures along the first long side 140 and the second long side 141. The rear air vents 184 are located at the centre of the shot peening valve controller back cover 194. A rear side of the round male DIN connector 156 is seen mounted on the shot peening valve controller back cover 194 near the first long side 140. The shot peening valve controller back cover 194 is then screwed into the chassis 138 by four locking screws 158 through the four holes 159. The chassis 138 contains four corresponding screw retainers at the four corners thereof that are not shown.

Figure 8:
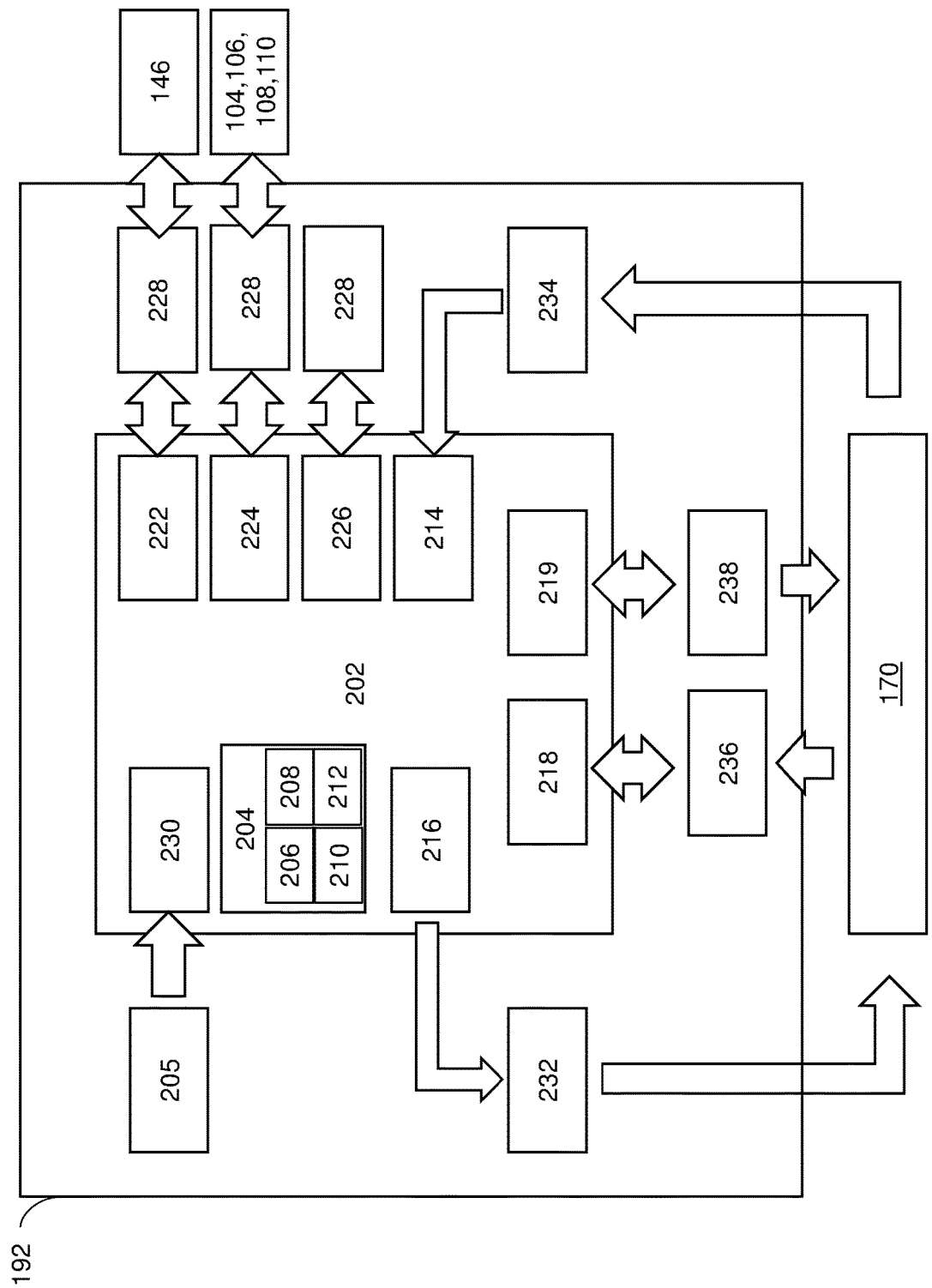
FIG. 8 illustrates a schematic diagram on connection of the shot peening valve controller.

FIG. 8 illustrates a schematic diagram 200 on connection of the shot peening valve controller 102 with peripheral components. The peripheral components include the programmable logic controller (PLC) 170 and the plurality of valves 104,106,108,110. The PLC 170 is connected to a printed circuit board 192 via the connectors 180,182,186, 188 located at the rear of the shot peening valve controller 102. The connectors 180,182,186,188 are soldered onto the printed circuit board 192. The printed circuit board 192 has embedded electrical routing that connects to a microcontroller 202.

The plurality of valves 104,106,108,110 are connected via the round male DIN connector 158 also located at the rear of the shot peening valve controller 102. The round male DIN connector 158 is then connected to a 485-module 228 located inside the shot peening valve controller 102 and then to the microcontroller 192 on the printed circuit board 192.

On the printed circuit board 192, the microcontroller 202 is surface mounted thereon. The microcontroller 202 is a Texas Instruments F28M35E20B. The microcontroller 202 comprises a core processor (not shown) attached with a heatsink (not shown), a CPU cooling fan (not shown), a timer (not shown), a plurality of memory 204, a plurality of serial communications peripheral, an Analogue-to-Digital converter (ADC) 214, a Pulse Width Modulator (PWM) 216 and a General-Purpose Input/Output (GPIO) 218,219. The microcontroller 202 is powered by a three point three Volts direct current (3.3 Vac) electrical voltage source (not shown). The 3.3 Volts is electrically regulated through a regulator 205 before feeding a regulated voltage $V_{dd}$ to the microcontroller 202.

The plurality of memory 204 comprises a SRAM (Static Random Access Memory) 206, a Flash memory 208, a ROM (Read Only Memory) 210 and a EEPROM (Electrically Erasable Programmable Read-Only Memory) 212.

The plurality of serial communications peripheral 214 comprises a Controller Area Network (CAN) (not shown) and a plurality of Universal Asynchronous Receiver/Transmitter (UART). There are three UARTs namely a UART3 222, a UART4 224 and a UART5 226. The UART3 222, UART4 224 and UART5 226 are connected to three 485-module 228.

The 485-module 228 is a communication module between the microcontroller 202 and the valves 104,106,108,110. The 485-module 228 also communicates with the tactile display screen 146. The 485-module 228 is powered by a five Volts direct current (5 $V_{dc}$) electrical voltage source (not shown). The 485-module 228 adopts the TIA/EIA-485 standard that defines the electrical characteristic of drivers and receivers for use in serial communications. The 485-module 228 uses a one pin for transmission and a second pin for receiving data. A third pin may be used for a ground.

The Analogue-to-Digital converter (ADC) 214 is an integrated circuit mounted on the printed circuit board 192. The ADC 214 is connected to an analogue input module 234. The analogue input module 234 is mounted on the printed circuit board 192. The analogue input module 234 is connected to the five-pinned analogue input connector 186 via electrical routings embedded in the printed circuit board 192.

The five-pinned analogue input connector 186 has four input pins, AI1 to AI4 and AIC which is an analogue input ground. The analogue input signals are from the PLC 170 via the five-pinned analogue input connector 186 to the analogue input module 234 then to the ADC 214 at the printed circuit board 192.

AI1 provides a control of the flowrate and corresponds to the flowrate of the first shot peening valve 104. AI2 provides a control of the flowrate and corresponds to the flowrate of the second shot peening valve 106. AI3 provides a control of the flowrate and corresponds to the flowrate of the third shot peening valve 108. AI4 provides a control of the flowrate and corresponds to the flowrate of the fourth shot peening valve 110. The varying input voltage of 0 Volts to 10 Volts from the PLC 170 to the analogue input module 234 corresponds to 1 kilogram to 13 kilograms of shot particles. The shot particles are dependent on the maximum flowrate each individual valve can handle. The control of the flowrate is done by the microcontroller 202 via the tactile display screen 146 as an input channel.

The Pulse Width Modulator (PWM) 216 is an integrated circuit mounted on the printed circuit board 192. The PWM 216 is connected to an analogue output module 232. The analogue output module 232 is mounted on the printed circuit board 192. The analogue output module 232 is connected to the five-pinned analogue output connector 188 via electrical routings embedded in the printed circuit board 192. The five-pinned analogue output connector 188 has four output pins AO1 to AO4 and AOC which is an analogue output ground.

The analogue output signals are from the PWM 216 to the analogue output module 232 to the five-pinned analogue output connector 188 then to the PLC 170. The analogue output signals provide a feedback signal to the PLC 170. AO1 corresponds to the real time actual flowrate of the first shot peening valve 104. AO2 corresponds to the real time actual flowrate of the second shot peening valve 106. AO3 corresponds to the real time actual flowrate of the third shot peening valve 108. AO4 corresponds to the real time actual flowrate of the fourth shot peening valve 110.

The programmable General-Purpose Input/Output (GPIO) supports a plurality of programmable input/output pins, particularly a GPIO1 218 and a GPIO2 219. The GPIO1 218 is connected to a digital input module 236 and then to the ten-pinned digital input connector 182. The GPIO2 219 is connected to a digital output module 238 and then to the ten-pinned digital output connector 180. The ten-pinned digital input connector 182 and the ten-pinned digital output connector 180 are then connected to the PLC 170.

The digital output signals are from the GPIO2 219 via the digital output module 238 to the ten-pinned digital output connector 180 to the PLC 170. The digital output signals have nine signals, DO1 to DO8 and DOC which is a digital output ground. DO1 is an indicator signal indicating that the first shot peening valve 104 is on. DO2 is an indicator signal indicating that the second shot peening valve 106 is on. DO3 is an indicator signal indicating that the third shot peening valve 108 is on. DO4 is an indicator signal indicating that the fourth shot peening valve 110 is on. DO5 is an alarm signal for the first shot peening valve 104. DO6 is an alarm signal for the second shot peening valve 106. DO7 is an alarm signal for the third shot peening valve 108. DO8 is an alarm signal for the fourth shot peening valve 110.

The digital input signals are from the PLC 170 via the ten-pinned digital input connector 182 to the digital input module 236 then to the GPIO1 218. The digital input signals have eleven signals, DI1 to DI10 and DIC which is a digital input ground. DI1 is an enabled signal to the first shot peening valve 104. DI2 is an enabled signal to the second shot peening valve 106. DI3 is an enabled signal to the third shot peening valve 108. DI4 is an enabled signal to the fourth shot peening valve 110. DI5 corresponds to a product select bit 5. DI6 corresponds to a product select bit 4. DI7 corresponds to a product select bit 3. DI8 corresponds to a product select bit 2. DI9 corresponds to a product select bit 1. DI10 corresponds to a product select bit 0.

The power supply terminal is represented by the three-pinned power connector 190 to the shot peening valve controller 102 as shown in FIG. 6. A positive 24 Volts input voltage is stepped down to three distinct voltages. First, a +5 Volts to supply to the 485-module 228. Secondly, a +3.3 Volts, $V_{dd}$ 230 to the microcontroller 202. Thirdly, a +12.6 Volts and a −3.3 Volts to the analogue output module 232 and the analogue input module 234.

The double arrowheads (e.g. ⇔) in FIG. 8 refer to a two-way communication, which includes both input and output. The single arrowheads (e.g. ⇒) refer to the unidirectional communication (e.g. input or output) between two components or devices.

The communication between the shot peening valve controller 102, the PLC 170 and the shot peening valves 104,106,108,110 uses the Modbus RTU protocol. The Modbus RTU is an open, serial (RS-232 or RS-485) communication protocol derived from the Master/Slave architecture. It is a widely accepted protocol due to its ease of use and reliability. Modbus RTU is optionally used within Building Management Systems (BMS) and Industrial Automation Systems (IAS). One example of the IAS is the use of PLC 170. The Modbus RTU is used in serial communication and makes use of a compact, binary representation of the data for protocol communication. The RTU format follows the commands/data with a cyclic redundancy check (CRC, as error-detecting code) checksum as an error check mechanism to ensure the reliability of data. Modbus RTU is the most common implementation available for Modbus. A Modbus RTU message must be transmitted continuously without inter-character hesitations. Modbus messages are framed (separated) by idle (silent) periods.

Functionally speaking, the shot peening valve controller 102 provides a main control of the four connected shot peening valves 104,106,108,110. The main control is made possible by a human machine interface (HMI) on the shot peening valve controller 102. The human machine interface is the tactile display screen 146 (also known as touchscreen) which is installed on a vertical plane at a level of an eye of a human operator for ease of reading and contacting.

The tactile display screen 146 provides an input channel for the human operator as well as an output channel. The input is processed by the microcontroller 202 inside the shot peening valve controller 102. The microcontroller 202 has a set of algorithms to process the inputs and produce the appropriate actions to control the shot peening valves 104, 106,108,110.

The programmable logic controller (PLC) 170 has three core modules: a power supply, a central processing unit and an input/output section. Each module can be slide into a rack and plug in. The rack is the component that holds the three core modules and other components together. The central processing unit (also known as microcontroller) comprises a microprocessor, memory chip and other integrated circuits to control logic, monitoring and communications. The central processing unit has different operating modes. In a programming mode, the PLC 170 accepts downloaded logic from the shot peening valve controller 102. After the download is complete, the central processing unit is placed in a run mode to execute the updated program or algorithm and operate the shot peening process.

The PLC 170 performs a repetitive set of instructions based on the inputs from the shot peening valve controller 102 primarily the digital outputs and the analogue outputs thereof. The digital outputs from the shot peening valve controller 102 to the PLC 170 are from the digital output module 238 which comprises DO1 to DO8 and DOC. DO1 corresponds to the first shot peening valve 104 indicator is on. DO5 corresponds to the first shot peening valve's 104 alarm. The analogue outputs from the shot peening valve controller 102 to the PLC 170 are from the analogue output module 232 which comprises AO1 to AO4 and AOC. AO1 corresponds to the flowrate of the first shot peening valve 104.

The PLC 170 after processing the inputs then outputs digital signals and analogue signals. The digital signals are sent to the digital input module 236. The digital signals are represented by DI1 to DI10 and DIC. DI1 corresponds to the first shot peening valve 104 enabled. DI5 to DI10 corresponds to product selection.

The first electric cable 112, the second electric cable 114, the third electric cable 116 and the fourth electric cable 118 are twisted pair wires with seven wires within each cable. The four cables are insulated providing electrical noise elimination and interference. The two terminal ends of the cables 112,114,116,118 are terminated by one male DIN connector at the first end and one female DIN connector at the other end. The different terminal ends ensure that noise and cross-talk between cables is reduced or eliminated.

The shot peening valve controller 102 has the rectangular panel 136 at the front side. The rectangular panel 136 provides a frame for supporting thereof when installing onto the vertical plane. The vertical plane is a metallic panel of a machine (not shown) with a countersunk corresponding rectangular-shaped aperture. The four bottom sides of the rectangular panel 136 rests in the corresponding rectangular-shaped aperture with a depth of one millimetre (1 mm). The rectangular panel 136 is flushed (leveled) with a surface of the vertical plane.

The shot peening valve controller 102 is positioned in a portrait orientation with the shot peening valve controller width 142 in a horizontal plane and the shot peening valve controller length 144 orthogonal to the horizontal plane. The portrait orientation provides easy reading for the human operator as he or she reads from the left to the right and from the top to the bottom of the tactile display screen 146.

The tactile display screen 146 is housed by the display protective casing 150. The tactile display screen 146 is a capacitive touch screen made from multiple layers of glass. The inner layer conducts electricity and so does the outer layer so effectively the screen behaves like two electrical conductors separated by an insulator. The human operator can use a bare finger, a gloved finger or a stylus to enter his or her input. The input is triggered on the screen by having an electrical charge that includes human skin.

The display protective casing 150 provides a protective outer casing for the opposite side of the tactile display screen 146 and to protect the internal circuitry. The plastic air vent cover 152 provides a protective flap over the universal serial bus type B connector 160, the DE-9 male connector 162 and the RJ45 connector 164. The plastic air vent cover 152 is easily removed by using a finger or a flathead screw driver to pry open at an edge.

The universal serial bus (USB) type B connector 160, the DE-9 male connector 162 and the RJ45 connector 164 provide serial communication to the microcontroller 202 located in the chassis 138. The communication provides software updates between a laptop or a desktop and the microcontroller 202.

The plurality of fixing aperture 154 provides anchor for specialised made attachments to the machine to be installed onto. The chassis 138 provides a protective casing for the printed circuit board 192 and other peripheral components like connectors along the display protective casing 150 and the shot peening valve controller back cover 194.

The ten-pinned digital output connector 180, the ten-pinned digital input connector 182, the five-pinned analogue input connector 186 and the five-pinned analogue output connector 188 provide communication to the programmable logic controller (PLC) 170. The ten-pinned digital output connector 180 and the ten-pinned digital input connector 182 are grouped together on the first long side 140 whilst the five-pinned analogue input connector 186 and the five-pinned analogue output connector 188 are grouped together on the second long side 141. The segregation is to provide an isolation of the electrical signals preventing interference. The analogue voltages can range from −3.3 Volts to +24 Volts whilst the digital voltages ranges from 0 Volts to +5 Volts. All the voltages are with reference to a common electrical ground.

The round male DIN connector 156 provides a direct link to the first shot peening valve 104. Subsequent shot peening valves 106,108,110 are linked to one another using the cables 112,114,116,118. The round male DIN connector 156 has seven pins. The +24V at one of the seven pins provides power to the four shot peening valves 104,106,108,110.

The rear air vent 184 provides a channel for a hot air to escape to prevent overheating. A cooling fan is installed inside the chassis 138 to effectively expel the hot air from the chassis 138.

The shot peening valve controller 102 has an operating voltage of +24 Volts direct current and can operate at a maximum load current of 0.5 Amperes. The analogue input signals range from 0 to 10 Volts. The flowrate recording output signals range from 0 to 10 Volts. The flowrate enable output signals range from 0 to 10 Volts at 10 mA (milli Amperes). The operating temperature ranges from 0 to 55° C. (32 to 122° F.).

The shot peening valve controller 102 further provides a flowrate display of all the four valves 104,106,108,110. The valve status is also displayed. There are six languages installed in the shot peening valve controller 102 namely English, Spanish, French, German, Chinese simplified, and Japanese. Other languages can be added as well.

The shot peening valve controller 102 also provides a storage of fifty shot peening recipes. The shot peening recipes may consist of different dimension of shot particles used and the rate of flow.

Figure 9:
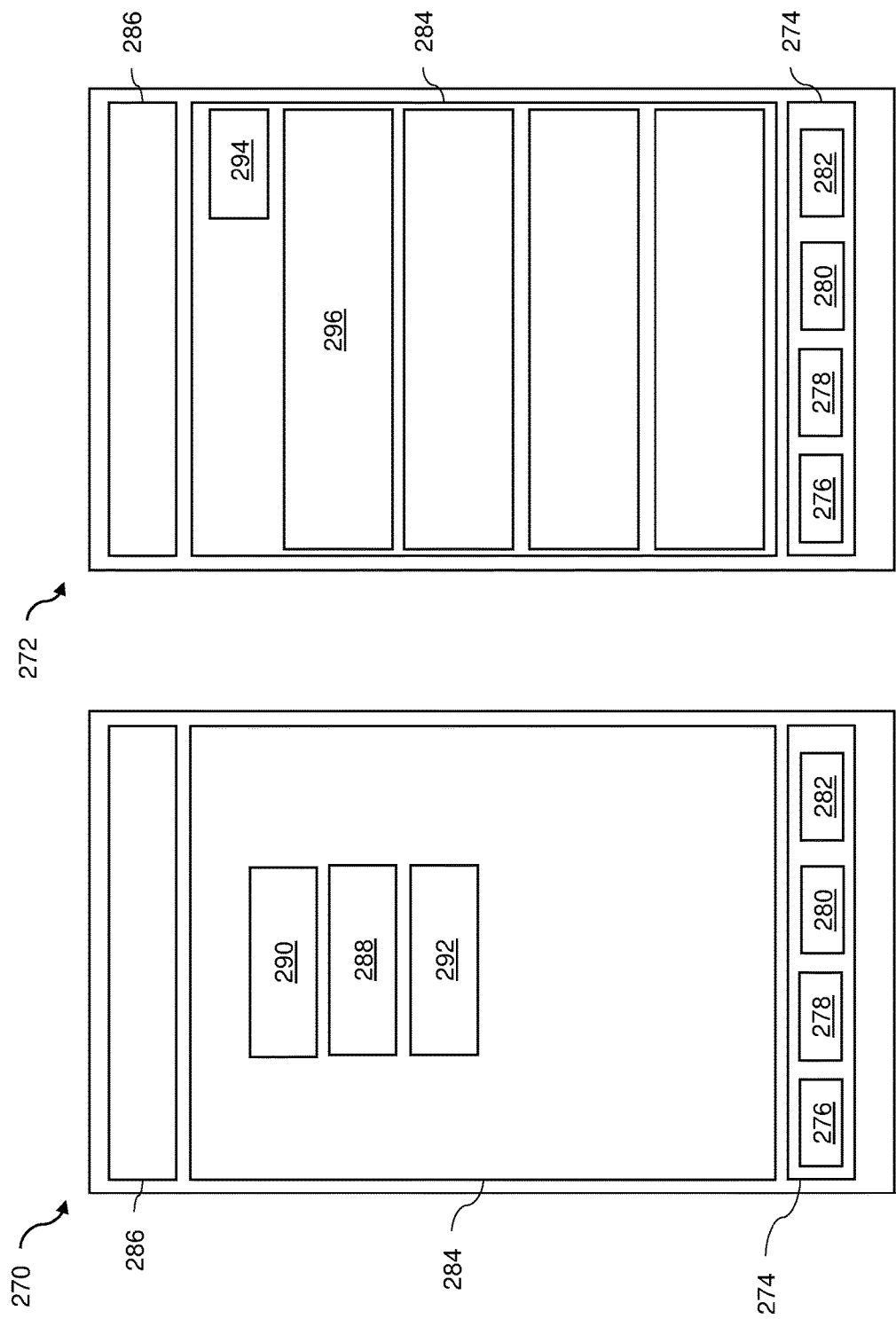
FIG. 9 illustrates a user interface displayed on the tactile display screen.

In operation, the shot peening valve controller 102 provides a main display 270 and a valve status control display 272 as shown in FIG. 9 on the tactile display screen 146.

FIG. 9 illustrates two user-interfaces (UI) displayed on the tactile display screen 146.

A menu bar 274 is permanently displayed at the bottom of the tactile display screen 146. At the menu bar 274, there are four options to choose, an Information button 276, an Alarm button 278, a Setup button 280 and a Main button 282. Above the menu bar 274 is a data display panel 284. Above the data display panel 284 is a title bar 286 which indicates to the human operator the information presented on the current display. The title bar 286 displays "Information" reflecting the current display. The menu bar 274 is permanently docked at the bottom regardless of whichever page is displayed above.

By default, upon initialisation, assuming only the first shot peening valves 104 is connected to the shot peening valve controller 102, the tactile display screen 146 displays one button at the data display panel 284. This one button is the valve label button 288 which indicates "Valve 1". Above the valve label button 288 is a valve status control button 290. Below the valve label button 288 is a "Contact Us" button 292.

When the human operator finger-tap on the valve label button 288, the valve status control display 272 is seen. The valve status control display 272 has also the title bar 286 at the top, the data display panel 284 at the middle and the menu bar 274 at the bottom. The data display panel 284 has a mode indicator 294 within specifically at the top right corner thereof. There are four valve status panel 296 within the data display panel 284 that indicates the status of the four valves 104,106,108,110. The status includes the flowrate specifically the set flowrate (target flowrate), the actual flowrate, the operational status (on or off) of the valve and the alarm status (on or off).

Within each box is a representation of one shot peening valve 104,106,108,110 which provides selection and deselection of either an actual flowrate expressed in kilogram per minute (kg/min) or a target flowrate expressed in a percentage. The human operator (e.g. technician) is able to enter a numeric value to one decimal placing for the actual flowrate or the target flowrate via the tactile display screen 146.

Additional selection and deselection like valve on/off and alarm on/off are also provided. The human operator can place his finger on the valve on/off to either switch on or off the valve he selects.

When the Information button (not shown) is pressed, the shot peening valve controller 102 provides an information displays three information selection namely the shot peening valve controller 102 itself, the shot peening valves 104 and a "Contact Us".

The first information relates to the shot peening valve controller 102 comprises four pages. On a first page of the shot peening valve controller 102 information shows a model, a serial number, a manufacturing date, a revision and a main power supply in Volts expressed to one decimal placing. The mentioned information is presented in a description followed by a text box, a new line then the next description in the new line and so on. Following each description, there is a text box that presents the actual shot peening valve controller 102 information. To proceed to a second page, the human operator taps on a "Next" button on the tactile display screen 146 which is located on the bottom right corner thereof.

On the second page shows the Inputs (digital) page where a plurality of input comprising a product select bit 0, a product select bit 1, a product select bit 2, a product select bit 3, a product select bit 4, a product select bit 5 and a Valve One on input (assuming only the first shot peening valve 104 is connected). Following each description is a green checkbox which is to indicate which item is present. A lit green checkbox implies the item is present. To proceed to a third page, the human operator taps on a "Next" button on the tactile display screen 146 which is located on the bottom right corner thereof.

On the third page shows the Outputs (digital) page where a plurality of output comprising a Valve One On enable and a Valve One Alarm output. The Valve One On enable is followed by one green checkbox. The Valve One Alarm output is followed by one red checkbox. To proceed to a fourth page, the human operator taps on a "Next" button on the tactile display screen 146 which is located on the bottom right corner thereof.

The fourth page shows the analogue inputs and analogue outputs page. Under the Analog Inputs is a "Valve One Flowrate Analog" represented by a numeric value with one decimal placing expressed in Volts. Under the Analog Outputs is a "Valve One Flowrate Ref Analog" represented by a numeric value with one decimal placing expressed in Volts.

The human operator is prevented from tampering with the four information pages of the shot peening valve controller 102.

The second information relates to the shot peening valve 104 information comprising two pages. On a first page is a model of the shot peening valve 104, a serial number, a manufactured date, a PO number and a revision. On a second page is a status of the valve, a manual mode, an auto mode and a valve alarm. The valve alarm has an associated red checkbox whilst the other three have green checkboxes. If the first shot peening valve 104 is connected the status of the valve will be lit. Either the manual mode or the auto mode is lit and not both. The valve 104 alarm is normally off.

The third information relates to the "Contact Us" page shows an address, a contact telephone, a fax number, an electronic mail address and the company logo.

The second option at the menu bar is the Alarm option. When the Alarm button is pressed, the alarm page is displayed. A date of alarm (ddmmyy), a time of alarm (2359) and a message are presented in a three-column table. At the right bottom of the screen within the data display panel is a "Alarm History" button. The human operator taps on the "Alarm History" button to proceed to a "Alarm History" page.

At the "Alarm History" page, the human operator can review the past record. A date, a time, a status and a message which are presented in a four-column table. A "Clear Alarm History" is located at the bottom left of the screen within the data display panel to provide for the deletion of records.

The third option at the menu bar is the Setup option. Under the setup page, there are further selections like a configuration button, an alarm setup button, a manual button and a program setting button. The configuration relates to the configuration of the shot peening valve controller 102. The alarm setup relates to the setting up of alarm. The manual relates to a setup of a manual flowrate. Password access is required to access manual setting. The program setting relates to a setup of program auto flowrate.

There are three pages of configuration. On the first page, particularly the shot peening valve controller 102, there is an option to choose between auto and manual, an option to choose between analogue and program for a flowrate input selection and an option to choose between pounds and kilograms for a measurement unit.

The auto option provides either an analogue or a program flowrate input. The manual option provides the manual entering of the flowrate in the manual setting which will be discussed shortly.

The flowrate input selection comprises the analogue option which enables the receipt of input signal from the PLC 170 and the program option which provides the selection of a desired programmed flowrate as determined in the program setting.

A second page of configuration relates to a setting of screen brightness, a setting of time in minutes before the screen saver is on, setting of a date and a time and a selection of languages from a list of six languages. The brightness is controlled by tapping on either the "+" or "−" button on the tactile display screen 146.

A third page of configuration relates to the media type or shot peening particles used by the first shot peening valve 104. There is a list of possible four media types available for the one valve 104. A plurality of information can be entered comprising a media size, a frequency in Hertz, a gain selection, a gain setting in percentage, and a speed setting in percentage. The gain setting and the speed setting provides a function of the proportional-integral-derivative (PID) control.

In the Alarm Setup, there is an alarm band in percentage, an alarm delay in seconds and a startup delay in seconds. The alarm band provides an upper and a lower limit to trigger the alarm. The delay alarm is set according to AMS2430 which is a specification relating to shot peening. The startup delay provides a buffer timing period that will not trigger the alarm even if the flowrate is out of the preset (pre-set) alarm band within the buffer period.

Using the example as listed here. The flowrate is 3 lbs/min, the alarm band is 10%, the alarm delay is one second and the startup delay is ten seconds.

After the first ten seconds, if the flowrate exceeds the alarm band of 10% for one second (alarm delay) continuously, the alarm will be triggered.

In the program setting, there is a selection box which contains multiple lines of program can be edited or just been created. There is a product name box which provides a program name entry. There is a flowrate box that provides the setting of the flowrate of each program in either kg/min or lbs/min.

The shot peening valve controller 102 provides two modes of operation; an auto mode and a manual mode. In the auto mode, two further modes of operation subsist; an analogue mode and a program mode.

Figure 10:
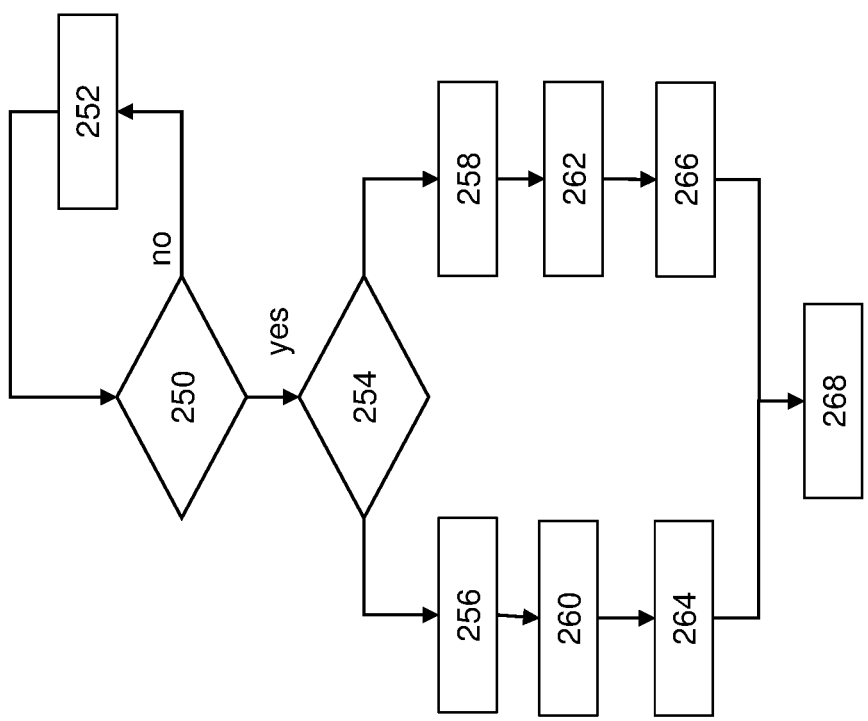
FIG. 10 illustrates an operation flowchart of the shot peening valve controller.

FIG. 10 illustrates an operation flowchart of the selection of the analogue mode or the program mode of the shot peening controller 102. The shot peening valve controller 102 waits for a received start signal 250. If there were no signal, the waiting start signal is on 252. Conversely if the start signal is present, the shot peening valve controller 102 will wait for the mode select 254.

In the analogue mode 256, the analogue input signals are received from the PLC 170 260 in the range of 0 Volts to 10 Volts. The voltages correspond to a minimum to a maximum weight of the shot peening particles which is about 1 kilogram (0 Volts) to 13 kilograms (10 Volts). In other words, to convert the analogue input to feed the data 264 and then feeding the data 268 into the first shot peening valve 104.

In the program mode 258, there is a plurality of green indicators displayed on the tactile display screen 146 indicating a model number selection. The model number corresponds to the different program or product. There are six bits as indicated by DI5 to DI10 which are the sent to the digital input module 236 then to the GPIO1 218. The program selection is received from the digital inputs 262. The load feed data is retrieved from the internal memory 266 and then feeding the data 268 into the first shot peening valve 104.

DI5 corresponds to a product select bit 5. DI6 corresponds to a product select bit 4. DI7 corresponds to a product select bit 3. DI8 corresponds to a product select bit 2. DI9 corresponds to a product select bit 1. DI10 corresponds to a product select bit 0. The six bits provide sixty-four different program or product. For example, product 0 is indicated by six zeroes (000 000) whilst product 63 is indicated by six ones (111 111). Therefore, if product 63 is selected, the six indicator lights displayed on the tactile display screen 146 will indicate green. Conversely, if product 0 were selected, the six indicator lights displayed on the tactile display screen 146 will indicate off.

In the manual mode, the shot peening valve controller 102 provides a manual setting of the flowrate of the shot peening valves 104,106,108,110 individually. The manual mode is an open-loop operation whereby a real time flowrate is irretrievable. The human operator can enter a percentage of the flowrate to one decimal place on the tactile display screen 146.

A method of installing the shot peening valve controller 102 for the four shot peening valves 104,106,108,110 comprising steps of a first, connecting the first electric cable 112 from the round male DIN connector to the first valve input port 120. Secondly, connecting the second electric cable 114 from the first valve output port 122 to the second valve input port 124. Thirdly, connecting the third electric cable 116 from the second valve output port 126 to the third valve input port 128. Fourthly, connecting the fourth electric cable 118 from the third valve output port 130 to the fourth valve input port 132. Fifthly, connecting the three-pinned power connector 190 to an electrical power source providing the +24 Volts electrical supply. Sixthly, connecting the ten-pinned digital output connector 180 to the programmable logic controller (PLC) 170. Seventhly, connecting the ten-pinned digital input connector 182 to the programmable logic controller (PLC) 170. Finally, connecting the five-pinned analogue input connector 186 and the five-pinned analogue output connector 188 which exists as the third ten-pinned connector to the programmable logic controller (PLC) 170.

A method of configuring the shot peening valve controller 102 comprising the steps of first, checking if there exists a start signal. Secondly, selecting an analogue mode or a programme mode if receiving the start signal. Thirdly, receiving an analogue input under an analogue mode. Fourthly, converting the analogue input to feed data. Fifthly, choosing a programme under a programme mode. Sixthly, loading feed data from a memory. Seventhly, transferring the feed data to a shot peening valve. Finally, receiving a feedback from the first shot peening valve 104.

Figure 11:
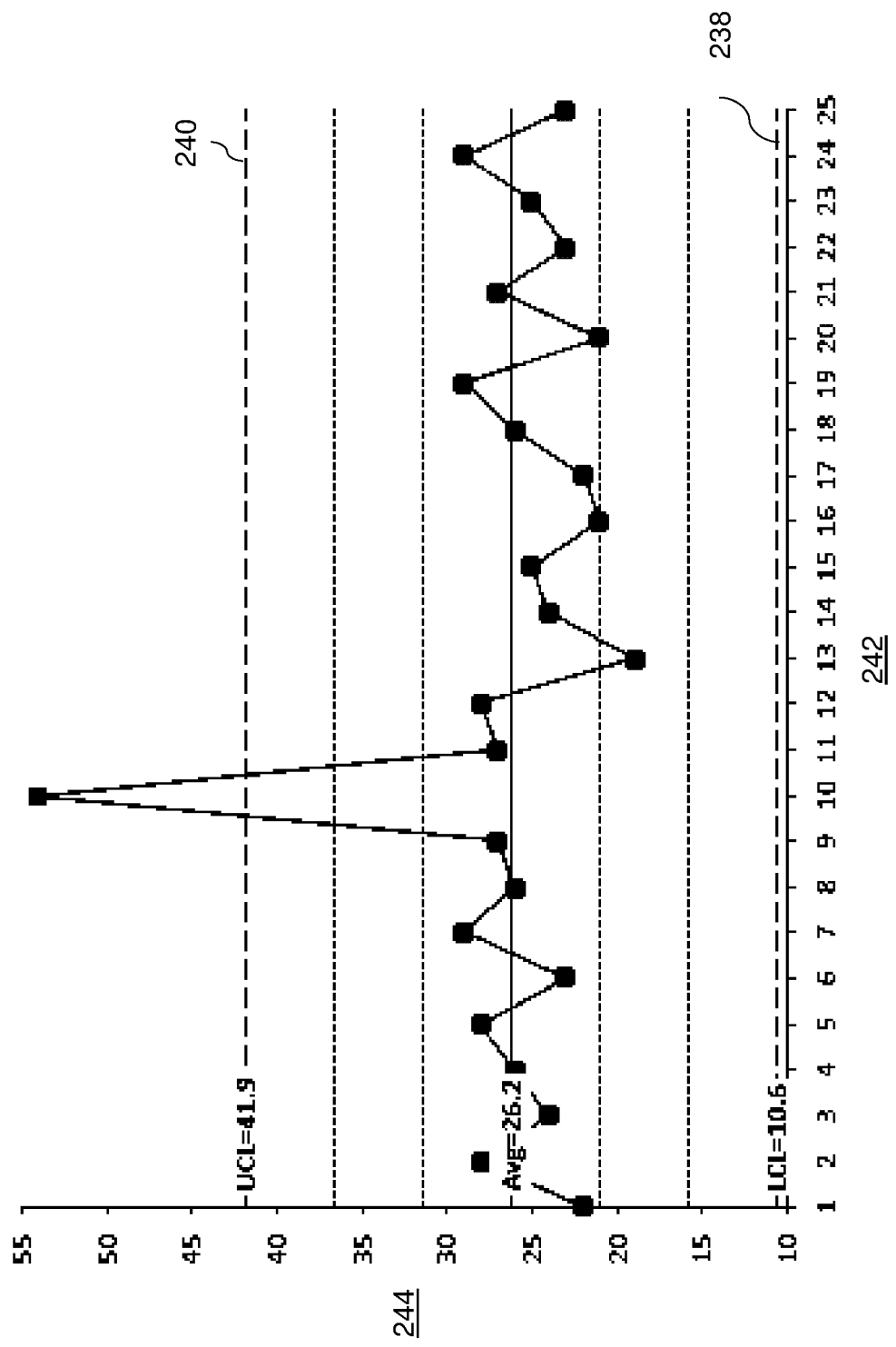
FIG. 11 illustrates an operational profile of the one shot peening valve over a range of operation period in days.

FIG. 11 illustrates an operational profile of the one shot peening valve over a range of days for the purpose of statistical process control (SPC) analysis. The application of SPC involves three main phases of activity. First, is to provide an understanding of the shot peening process and the specification limits. Secondly, is to provide elimination of special sources of variation, so that the process is stable. Thirdly, is to monitor the ongoing production process, assisted by the use of control charts, to detect significant changes of mean or variation. An observation can be made from FIG. 11 is that there is a variation on Day 10 with an exceptional long usage time of close to 55 minutes which is above the set upper control limit 240 of 41.9. The other days are operating within the control limits 238,240 with a mean time of 26.2 minutes. The information is helpful for controlling the quality of the shot peening process. In this case, the quality of the shot peening process on Day 10 might be compromised.

The shot peening valve controller 102 provides a method of plotting a chart and displaying on the tactile display screen 146 compromises the steps of first, selecting at least one shot peening valve 104,106,108,110 for analysing the usage thereof.

Secondly, defining the range of days (at least one day) to chart. By default, the day(s) is the x-axis and the time is the y-axis. The human operator can choose the range of days to monitor either by doing it on the shot peening valve controller 102 or retrieving (downloading) the data from the memory 204 and plot the chart using Microsoft Excel or other plot charting tools. The data from the memory 204 is a comma delimited text file (.txt) whereby the two fields (day and time) are separated by commas and the next set of field is differentiated by a semicolon. For example, 1.20; 2.25; 3.30.

The time scale is scalable. In other words, the y-axis is dependent on the minimum time and the maximum time logged in the memory 204 of the microcontroller 202. For example, the minimum time for the first shot peening valve 104 could be five seconds on day one and the maximum time is sixty minutes on day ten. An algorithm in the microcontroller 202 is intelligent to determine the range for the y-axis of time is from zero seconds to 3,605 seconds (60 minutes by 60 seconds equals 3,600 seconds). An extra margin of at least five seconds is added for the minimum time and the maximum time range for the y-axis.

Thirdly, optionally set the upper control limit (UCL) 240 and the lower control limit (LCL) 238 to provide meaningful information to the chart. The LCL 238 and the UCL 240 is pre-defined by the human operator. A narrow margin will imply that the shot peening valves 104,106,108,110 have to operate in a much stringent operating condition. Conversely, a large margin would mean a lax operating condition.

In the application, unless specified otherwise, the terms "comprising", "comprise", and grammatical variants thereof, intended to represent "open" or "inclusive" language such that they include recited elements but also permit inclusion of additional, non-explicitly recited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. The description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

REFERENCE NUMERALS 100 shot peening valve assembly
102 shot peening valve controller
104 first shot peening valve
106 second shot peening valve
108 third shot peening valve
110 fourth shot peening valve
112 first electric cable
114 second electric cable
116 third electric cable
118 fourth electric cable
120 first valve input port
122 first valve output port
124 second valve input port
126 second valve output port
128 third valve input port
130 third valve output port
132 fourth valve input port
134 fourth valve output port
136 rectangular panel
138 chassis
140 first long side
141 second long side
142 hub controller width
144 hub controller length 146
146 tactile display screen
148 diagonal length
150 display protective casing
152 plastic air vent cover
154 fixing aperture
156 round male DIN connector
158 locking screws
159 hole
160 universal serial bus type B connector
162 DE-9 male connector
164 RJ45 connector
170 programmable logic controller (PLC)
172 digital input cable
174 digital output cable
176 analogue input cable
178 analogue output cable
180 ten-pinned digital output connector
182 ten-pinned digital input connector
184 rear air vents
186 five-pinned analogue input connector
188 five-pinned analogue output connector
190 three-pinned power connector
192 printed circuit board
194 hub controller back cover
200 schematics of hub controller
202 microcontroller
204 memory
205 regulator
206 SRAM (Static Random Access Memory)
208 Flash memory
210 ROM (Read Only Memory)
212 EEPROM (Electrically Erasable Programmable Read-Only Memory)
214 Analogue-to-Digital converter (ADC)
216 Pulse Width Modulator (PWM)
218 General-Purpose Input/Output 1, GPIO1
219 General-Purpose Input/Output 2, GPIO2
222 UART3
224 UART4
226 UART5
228 485-module
230 Vdd
232 analogue output module
234 analogue input module
236 digital input module
238 digital output module
250 received start signal?
252 waiting start signal on
254 mode select
256 analogue mode
258 program mode
260 receive analogue input
262 receive program selection from digital inputs
264 convert analogue input to feed data
266 load feed data from internal memory
268 transfer feed data into valve
270 main display
272 valve status control display
274 menu bar
276 Information button
278 Alarm button
280 Setup button
282 Main button
284 data display panel
286 title bar
288 valve label button
290 valve status control button
292 "Contact Us" button
294 mode indicator
296 valve status panel
238 lower control limit
240 upper control limit
242 day number
244 time in minutes

The invention claimed is:
1. A shot peening valve controller comprising:
a central processing unit configured to carry out instructions of a computer program;
a memory connected to the central processing unit for storing information of the computer program;
an input output unit further connected to the central processing unit that is connected to an external electronic device; and
an internal bus additionally connected to the central processing unit, the memory, the input output unit or a combination of any of these components;

wherein the input output unit comprises a user interface for displaying performance data of the shot peening valve controller;

wherein the input output unit further comprises multiple electronic addresses for connecting to multiple shot peening valves respectively;

wherein the shot peening valve controller is configured to power each of the multiple shot peening valves according to their electronic addresses respectively.

2. The shot peening valve controller of claim 1, wherein the user interface comprises a flat panel display for showing text and graph.

3. The shot peening valve controller of claim 1 further comprising a local power supply that is connected to the central processing unit.

4. The shot peening valve controller of claim 1 further comprising a reset switch for clearing pending errors or events of the shot peening valve controller.

5. The shot peening valve controller of claim 1 further comprising a protector for shielding components of the shot peening valve controller.

6. The shot peening valve controller of claim 5, wherein the protector comprises a sheltered heat dissipater for discharging hot air but inaccessible to falling dust or liquid spillage.

7. The shot peening valve controller of claim 1, wherein the shot peening valve controller is configured to process signals from multiple shot peening valves simultaneously.

8. The shot peening valve controller of claim 1, wherein the shot peening valve controller is configured to power multiple shot peening valves concurrently.

9. The shot peening valve controller of claim 1, wherein the input output unit comprises terminals connecting multiple shot peening valves respectively.

10. The shot peening valve controller of claim 1, wherein the input output unit comprises a detachable connector for connecting to at least one shot peening valve.

11. The shot peening valve controller of claim 1, wherein the input output unit further includes a communication interface, a digital input interface, a digital output interface, an analogue input output interface, a pulse counter and timer.

12. The shot peening valve controller of claim 1, wherein the multiple shot peening valves are connected via a round male DIN connector located at a rear of the shot peening valve controller, which is then connected to a 485-module located inside the shot peening valve controller and then to a microcontroller on a printed circuit board.

13. The shot peening valve controller of claim 12, wherein the microcontroller comprises a core processor attached with a heatsink, a CPU cooling fan, a timer, a plurality of memory, a plurality of serial communications peripheral, an Analogue-to-Digital converter (ADC), a Pulse Width Modulator (PWM) and a General-Purpose Input/Output (GPIO).

14. The shot peening valve controller of claim 13, wherein a Pulse Width Modulator (PWM) is mounted on the printed circuit board and is connected to an analogue output module mounted on the printed circuit board; wherein the PWM is adapted to generate a timed Analogue Voltage feedback based on the equivalent ADC from the signals received in Analogue Input module.

15. The shot peening valve controller of claim 13, wherein the plurality of serial communications peripheral comprises a Controller Area Network (CAN) and a plurality of Universal Asynchronous Receiver/Transmitter (UART).

16. The shot peening valve controller of claim 13, further configured to automatically or manually adjust the gain to one or more of its channels, ports or electric connections so that relevant shot peening processes at respective shot peening valves are adjusted to their preferred or best performance.

17. The shot peening valve controller of claim 13, wherein the user interface displays four valve status panel that indicate the status of four valves; wherein the status includes the flowrate specifically a set flowrate, an actual flowrate, an operational status of the valve and an alarm status; wherein an alarm setup includes an alarm band in percentage, an alarm delay in seconds and a startup delay in seconds, and the alarm band provides an upper and a lower limit of the flow rate to trigger the alarm.

18. The shot peening valve controller of claim 13, further comprises a program mode that enables to remotely select a stored recipe using product select bits; wherein a corresponding recipe is chosen by sending signal from the PLC to the Digital Input, which then goes through the GPIO1; wherein the program selection is received from the digital inputs, the load feed data is retrieved from the internal memory and then feeding the data into the multiple shot peening valves.

19. The shot peening valve controller of claim 1, wherein the shot peening valve controller allows the end user to select or store up to 4 different calibrated media types in each valve, thereby allowing the user to instantly change the abrasive without the need for the valve to be sent out for calibration as compared to a traditional one media calibrated valve.

20. A shot peening valve assembly comprising:
the shot peening valve controller according to claim 1; and
a first shot peening valve connected to terminals of the shot peening valve controller.

21. The shot peening valve assembly of claim 20 further comprising a second shot peening valve connected to the terminals of the shot peening valve controller.

22. The shot peening valve assembly of claim 20 further comprising
an electrical cable that is connected to the first shot peening valve, second shot peening valve and at least one of the terminals of the shot peening valve controller.

23. The shot peening valve assembly of claim 22, wherein at least one wire of the electrical cable is shared by the first shot peening valve and the second shot peening valve.

24. The shot peening valve assembly of claim 22, wherein the electrical cable comprises a protective layer.

25. A shot peening equipment comprising:
the shot peening valve assembly according to claim 20;
a first blast hose that is installed with the first shot peening valve; and
wherein both the first shot peening valve and second shot peening valve are connected to the shot peening valve controller for operating the first shot peening valve and the second shot peening valve independently.

26. The shot peening equipment of claim 25 further comprising
a computer that is connected to shot peening control valve.

27. The shot peening equipment of claim 25 further comprising
a power supply unit for powering the shot peening valve controller, the shot peening valve assembly, the shot peening equipment or a combination of any of these.

* * * * *